United States Patent [19]

Shafer

[11] Patent Number: 5,560,825
[45] Date of Patent: Oct. 1, 1996

[54] EDGE FILTER FOR A HIGH PRESSURE HYDRAULIC SYSTEM

[75] Inventor: Scott F. Shafer, Morton, Ill.

[73] Assignee: Caterpillar Inc., Peoria, Ill.

[21] Appl. No.: 263,314

[22] Filed: Jun. 21, 1994

[51] Int. Cl.⁶ ..................................... B01D 35/02
[52] U.S. Cl. .................. 210/430; 210/432; 210/488; 137/547
[58] Field of Search .................. 123/496; 210/428–430, 210/488, 359, 426; 137/544, 547

[56] References Cited

U.S. PATENT DOCUMENTS

| Re. 33,270 | 7/1990 | Beck et al. . | |
|---|---|---|---|
| 1,919,408 | 7/1933 | Work | 210/488 |
| 4,823,552 | 4/1989 | Ezell et al. . | |
| 4,934,143 | 6/1990 | Ezell et al. . | |
| 5,191,867 | 3/1993 | Glassey . | |
| 5,213,083 | 5/1993 | Glassey . | |

Primary Examiner—Matthew O. Savage
Attorney, Agent, or Firm—Dykema Gossett; Kevin M. Hinman

[57] ABSTRACT

An edge filter for use with a variable-displacement pump control is disclosed. The edge filter comprises a first portion disposed between a source of hydraulic actuating fluid and an orifice having a first flow area. The first portion has an outer circumference defining a radial gap within a bore. The gap has a predetermined gap width less than a diameter of the orifice.

3 Claims, 9 Drawing Sheets

5,560,825

EDGE FILTER FOR A HIGH PRESSURE HYDRAULIC SYSTEM

DESCRIPTION

1. Technical Field

The present invention relates generally to filters used in high pressure hydraulic devices. More particularly, this invention relates to filters used in devices supplying hydraulic actuating fluid at high pressure to hydraulically actuated fuel injectors.

2. Background Art

Examples of hydraulically-actuated fuel injection systems are shown in U.S. Pat. No. 5,191,867 issued to Glassey etal. on Mar. 9, 1993, and U.S. Pat. No. 5,213,083 issued to Glassey on May 25, 1993, both being assigned to the assignee of the present invention. Engines equipped with a hydraulically-actuated fuel injection system employ an actuating pump to provide hydraulic actuating fluid at elevated pressures to injectors which intensifies the pressure of the fuel being injected into the engine. Control of the fuel injection pressure is achieved by controlling the pressure of the actuating fluid. Devices controlling the pressure of the hydraulic actuating fluid often include one or more small orifices through which the fluid is passed. The blockage or plugging of such orifices can potentially cripple the fuel injection system by inhibiting or preventing the flow of pressurized hydraulic actuating fluid to the injectors.

Edge filters have been previously employed in fuel systems between a fuel pump and the fuel injectors to prevent orifices at the injector tip from becoming plugged by debris suspended in the fuel. Edge filters are characterized by a first portion establishing gaps between itself and a wall of an aperture or passage in which it is disposed. The gaps have a maximum height no larger than the size of particles it is intended to stop. The area of the gaps, however, is several times the area of the orifice so the edge filter does not significantly restrict flow through the orifice.

The present invention is directed to overcoming the problem as set forth above.

DISCLOSURE OF THE INVENTION

In one aspect of the present invention, an edge filter for a variable displacement pump control is disclosed comprising a first portion disposed in a bore between a source of hydraulic actuating fluid and an orifice having a first flow area. The first portion of the edge filter has an outer circumference defining a radial gap within the bore. The gap has a predetermined gap width which must be less than, and preferably significantly less than a diameter of the orifice.

The present invention prevents relatively large particles of debris from plugging an orifice in a displacement control of the variable displacement pump without appreciably impeding the flow of fluid through the orifice.

BRIEF DESCRIPTION OFT HE DRAWINGS

BEST MODE FOR CARRYING OUT THE INVENTION

Figure 1:
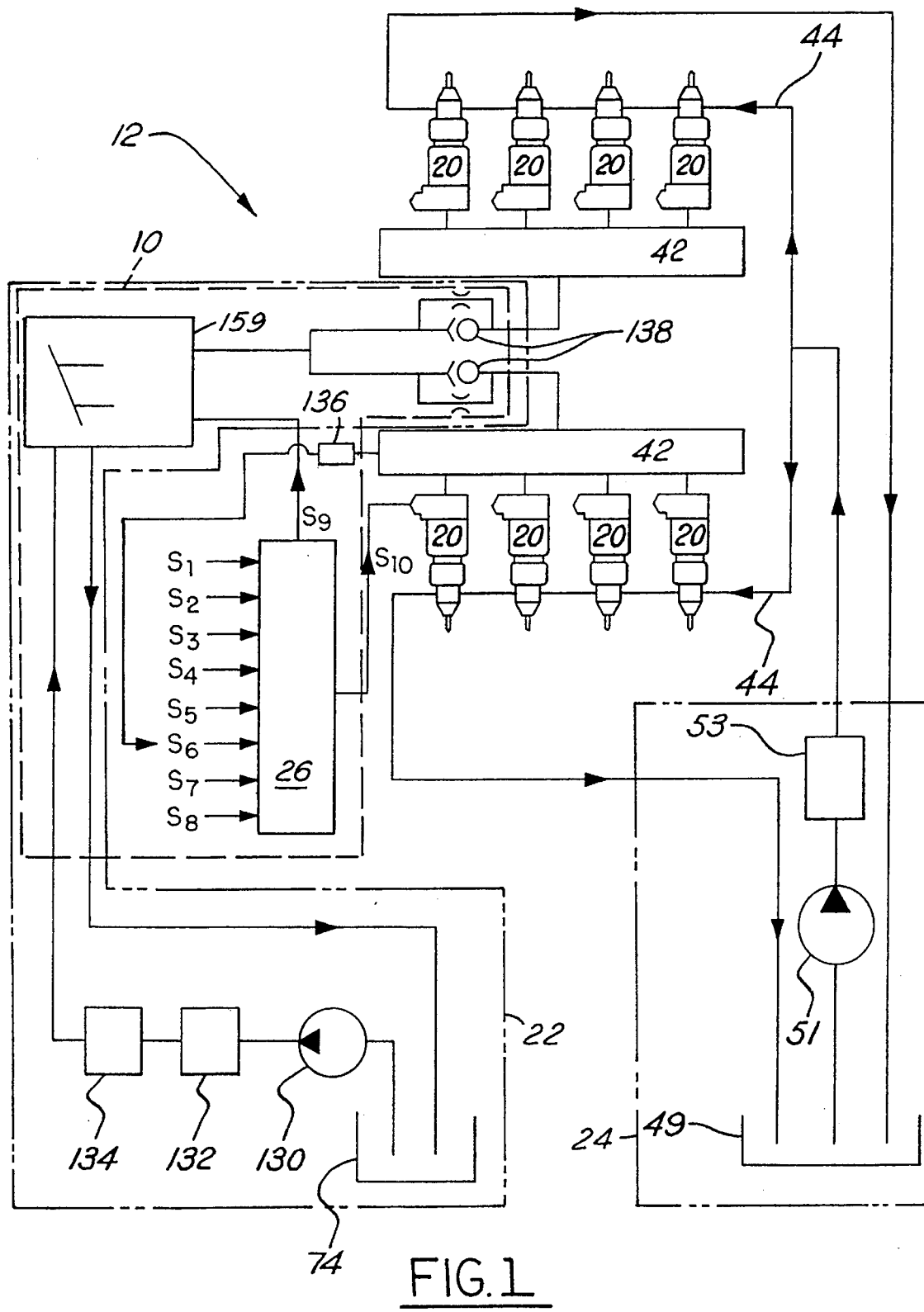
FIG. 1 is a schematic representation of a hydraulically-actuated electronically-controlled unit injector fuel system of the present invention, including both an actuating fluid circuit and a fuel supply circuit for an eight-cylinder internal combustion engine having eight unit injectors.

Referring to FIGS. 1 through 13, wherein the same reference numerals designate the same elements or features throughout all of FIGS. 1 through 13, a first embodiment of a pressure control system 10 is disposed in a hydraulically-actuated electronically-controlled injector system 12, hereinafter referred to as an HEUI fuel injection system. The exemplary pressure control system is shown in FIGS. 1, 2, 3 and 4 as being employed with a diesel-cycle direct-injection internal combustion engine 14. While a V-type 8-cylinder engine is illustrated in FIGS. 1, 2, 3 and 4 and described herein, it should be understood that the invention is also applicable to other types of engines, such as in-line cylinder engines and rotary engines, and that the engine may contain fewer or more than eight cylinders or combustion chambers. The exemplary engine 14, only partially shown in FIG. 2, has a pair of cylinder heads 16. Each cylinder head 16 has one or more unit injector bores 18 with four being provided here. The following description of the first embodiment will first describe the elements and operation of the HEUI system 12 and then will describe in more detail specifics of the pressure control system.

Figure 2:
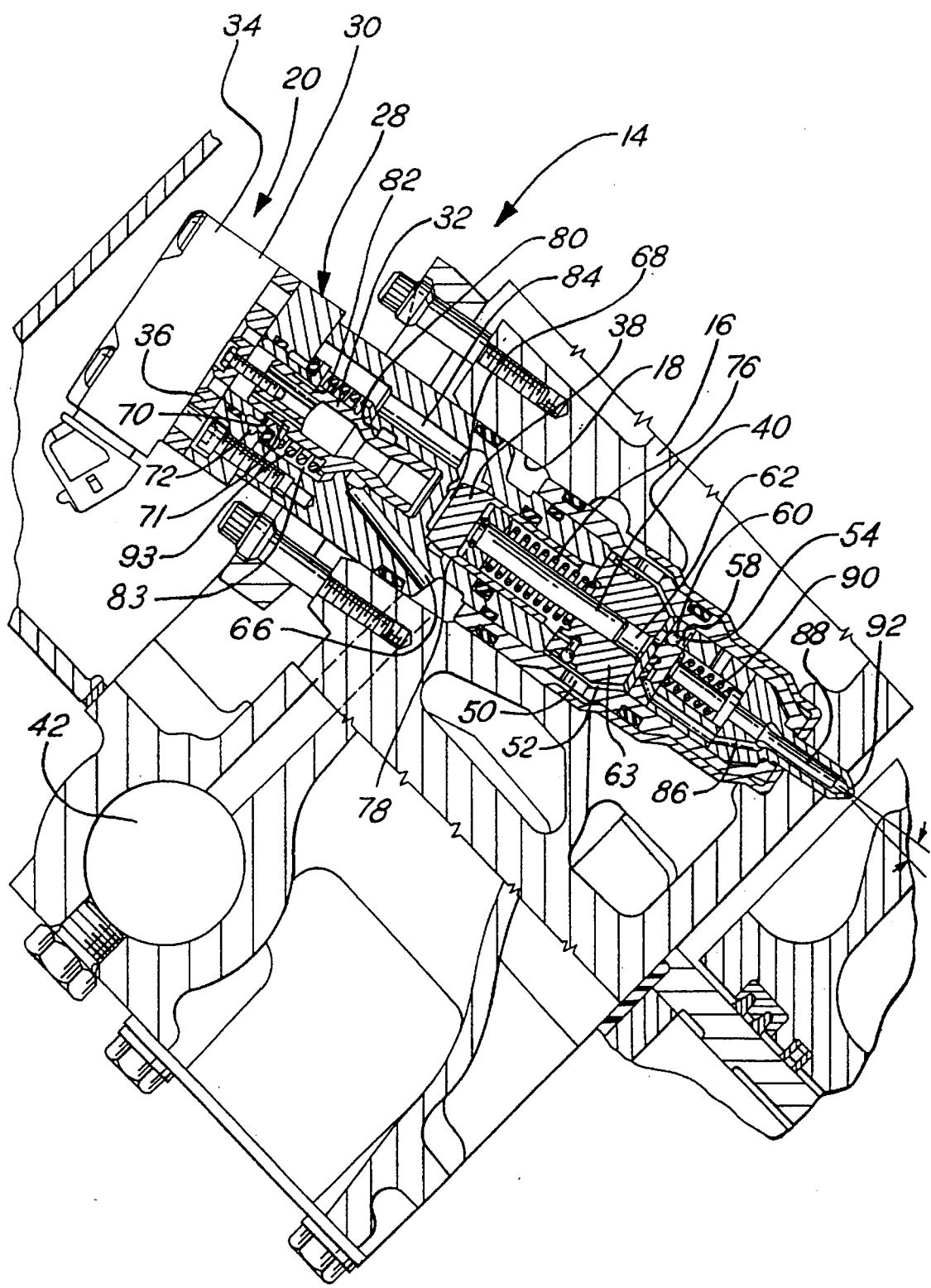
FIG. 2 is a diagrammatic partial cross-sectional view of one embodiment of a unit injector of FIG. 1 as installed in an exemplary internal combustion engine.

Referring to FIGS. 1 and 2, the HEUI fuel injection system 12 preferably includes one or more hydraulically-actuated electronically-controlled unit injectors 20 adapted to be positioned in a respective unit injector bore 18, means or device 22 for supplying hydraulic actuating fluid and damping fluid to each unit injector 20, means or device 24 for supplying fuel to each unit injector 20, and means or device 26 for electronically controlling the HEUI fuel system 12. While unit injectors 20 are preferred in this embodiment, other applications might be better served by non-unitized injectors.

An actuator and valve assembly 28 of each unit injector 20 is provided as a means or device for selectively communicating relatively high pressure actuating fluid to each unit injector 20 in response to receiving an electronic fuel delivery command signal S10 shown in FIG. 1. As shown in FIG. 2, the actuator and valve assembly 28 includes an actuator 30, preferably in the form of a solenoid assembly, and a valve 32, preferably in the form of a poppet valve.

The solenoid assembly 30 includes a fixed stator assembly 34 and a movable armature 36. The armature 36 is connected to the poppet valve 32. The unit injector 20 also has an intensifier piston 38 and an associated fuel pumping plunger 40 which may be either a separate component or integral with the piston 38. Actuating fluid manifolds 42 connect the unit injectors to the hydraulic fluid pressure control system 10. Fuel rails or manifolds 44 connect the unit injectors 20 with the device 24 for supplying fuel. An electronic control module 26 (ECM) serves as the means for electronically controlling the HEUI system. The ECM 26 receives input data signals from one or more signal indicating devices, for example eight signal indicating devices providing signals S1 through S8. Input data signals may include engine speed S1, engine crankshaft position S2, engine coolant temperature S3, engine exhaust back pressure S4, air intake manifold pressure S5, throttle position or desired fuel setting S7 and transmission operating condition indicative signal S8 which, for example, may indicate the gear setting of the transmission. S6 is a signal indicative of a pressure detected in the manifold 42. An output control signal S9 is the actuating fluid manifold pressure command signal directed to a primary pressure regulator or pump control valve 48 which is an element of the pressure control system 10.

The HEUI system operates in the following manner. Fuel is supplied at a relatively low pressure (for example, about 276 to 413 kPa or 40 to 60 psi) from a fuel tank 49 by a transfer pump 51 passing the fuel through a conditioning means 53 (such as a fuel filter and/or heater) and through the fuel manifolds 44 to the respective banks of unit injectors 20. Referring to FIG. 2, the fuel flows through case fuel inlet holes 50, an annular passage 52, a close-clearance passage 54 such as an edge filter, and then an inlet passage 58. A check valve 60 unseats when the pressure in a fuel pump chamber 62 is lower than the pressure upstream of the check valve 60 by a selected amount. While the check valve 60 is unseated, the fuel pump chamber 62 is refilled with fuel. The plunger 40 has an end disposed in a bore of a barrel assembly 63, thereby defining the fuel pump chamber 62.

While the solenoid assembly 50 is in its electrically de-energized state, the poppet valve 32 is at a first blocking position, blocking fluid communication between an actuating fluid inlet passage 66 and a piston pump chamber 68 while opening communication between the piston pump chamber 68 and an upper annular peripheral groove 70, and drain passage 72 that communicate with an actuating fluid sump 74 such as an engine oil pan. With negligible fluid pressure in the piston pump chamber 68, a plunger spring 76 pushes upwardly against the plunger 40 and intensifier piston 38 seating the piston 38 against a shoulder defined in a body 78.

The HEUI system allows at least one injection start point, at least one injection stop point, and the injection pressure to all be regulated independent of engine speed and load. The quantity of fuel delivered to an engine combustion chamber can consequently be varied independent of engine speed and load.

In order to start injection, the fuel delivery command signal S10 is emitted by the electronic control module 26 and delivered to an electronic drive unit (not shown). The electronic drive unit generates a preselected wave form to the solenoid assembly 30 of a selected unit injector 20. The solenoid assembly 50 is electrically energized so that the armature 36 is magnetically drawn towards the stator 34.

The poppet valve 32 is also pulled by the moving armature 36. The poppet valve 32 moves to an inject position where a lower seat 80 of the poppet valve 32 provides fluid communication between the inlet passage 66 and the piston pump chamber 68 while an upper seat 82 blocks fluid communication between the piston pump chamber 68 and the drain passage 72. Hydraulic actuating fluid at a relatively high pressure (for example, about 23 MPa or 3,335 psi) flows through the inlet passage 66, an annular body bore chamber 83, an intermediate passage 84 and piston pump chamber 68 and thereby hydraulically exerts a driving downward force on the intensifier piston 38.

The high pressure actuating fluid displaces the intensifier piston 38 and plunger 40 in opposition to the force generated by the compressed plunger spring 76 and fuel pressure. The fuel in the fuel pump chamber 62 is pressurized to a level which is a function of the pressure of the actuating fluid in the intensifier piston pump chamber 68 and the ratio of effective areas A1/A2 between the intensifier piston 38 and the plunger 40. This pressurized fuel flows from the fuel pump chamber 62 and through one or more passages 86 where it acts on a needle check 88 in opposition to a force exerted by a needle check spring 90. The pressurized fuel lifts the needle check 88 after a selected pressure level is reached and the highly pressurized fuel is injected through one or more injection spray orifices 92.

In order to end injection or control the quantity of fuel injected independent of engine speed and load, the electronic control module 26 discontinues its fuel delivery command signal S10 to the electronic drive unit. The electronic drive unit then discontinues its waveform thereby electrically de-energizing the solenoid assembly 30 of the selected unit injector 20. The absence of the magnetic force allows the compressed poppet spring 93 to expand causing both the armature 36 and poppet valve 32 to move downwardly until the valve 32 arrives at its back closed position. This allows the spent actuating fluid in the piston pump chamber 68 to exit through the annular body bore chamber 83, across the upper seat 82, through the annular peripheral groove 70, and drain passage 72 and to return to the actuation fluid sump 74. The plunger 40, returned by the compressed plunger spring 76, creates a pressure drop across the check valve 60, and refills the fuel pump chamber 62 for subsequent injections.

Figure 3:
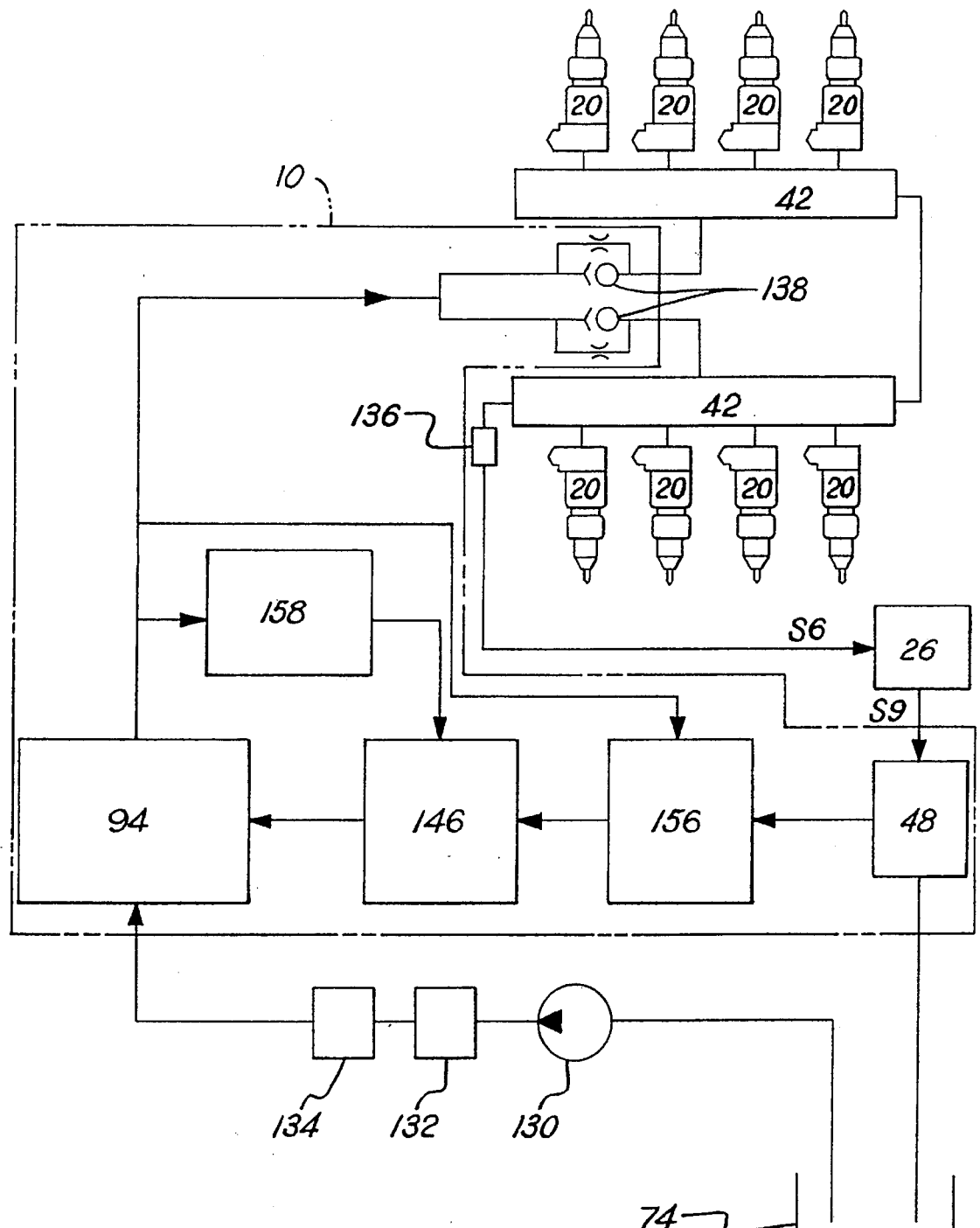
FIG. 3 is a schematic representation of a pressure control system employing a variable-displacement pump.
Figure 4:
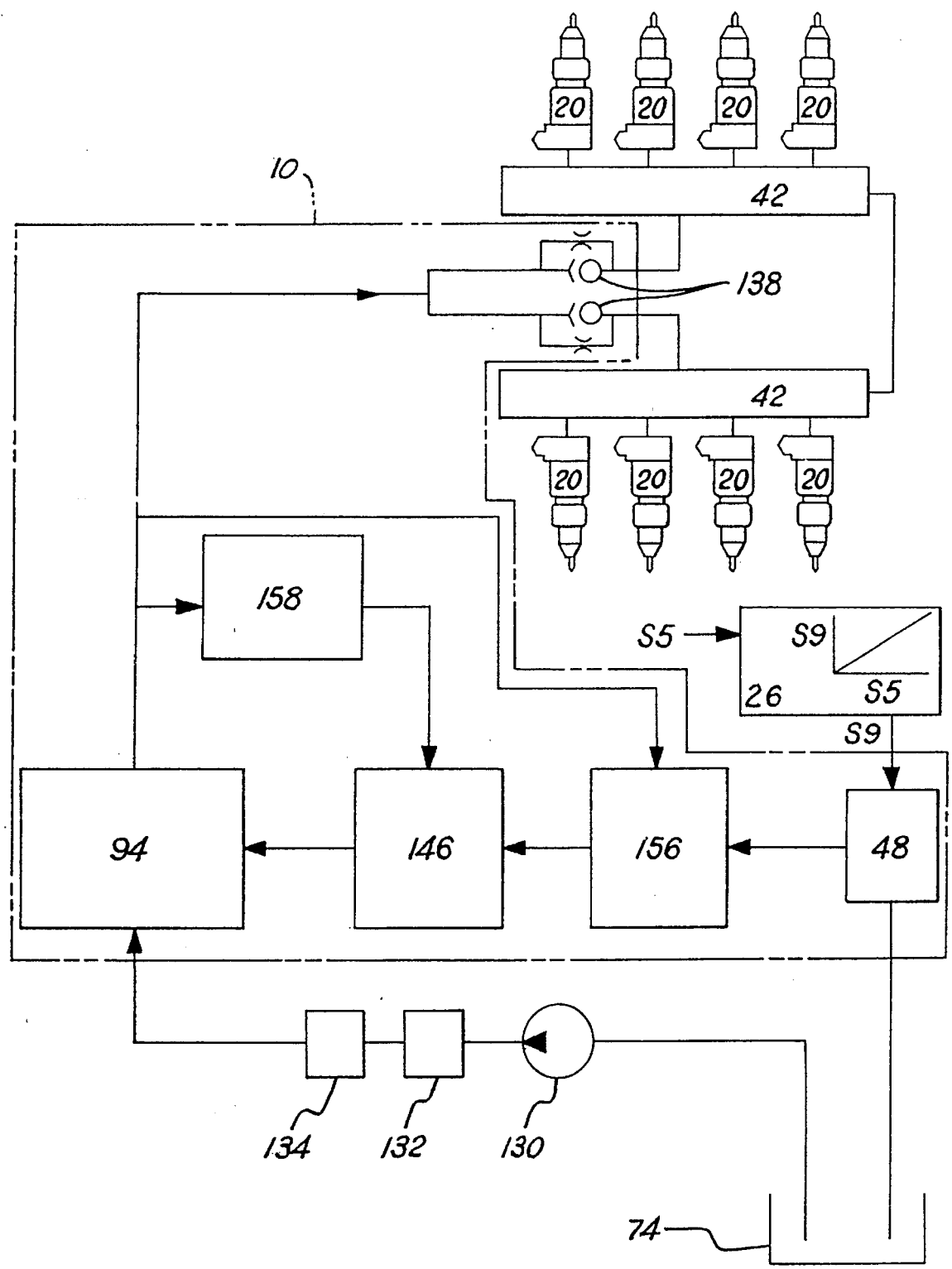
FIG. 4 is a schematic representation of an open loop pressure control system employing a variable-displacement pump.

The hydraulic actuating fluid pressure control system 10, shown in schematic form in FIG. 3 is a pressure control system which controls the output pressure of the hydraulic actuating fluid in the hydraulic actuating fluid manifold(s) 42. The system 10 is preferably a closed loop system, but alternatively is any operating system based on a known relationship between electrical current and the output pressure. The system 10 employs a variable-displacement hydraulic pump 94 and has means of controlling the fluid output of the pump, or output flow of pressurized actuating fluid. FIG. 4 shows the system 10 configured as an open loop pressure control system. Air intake manifold pressure, S5, is used by the ECM 26 to establish the amount of electrical current of signal S9. The relationship between S5 and S9 is merely illustrative. S9 can be alternatively determined by the ECM 26 as a function of any other appropriate parameter by itself or in combination with the other parameters.

Figure 5:
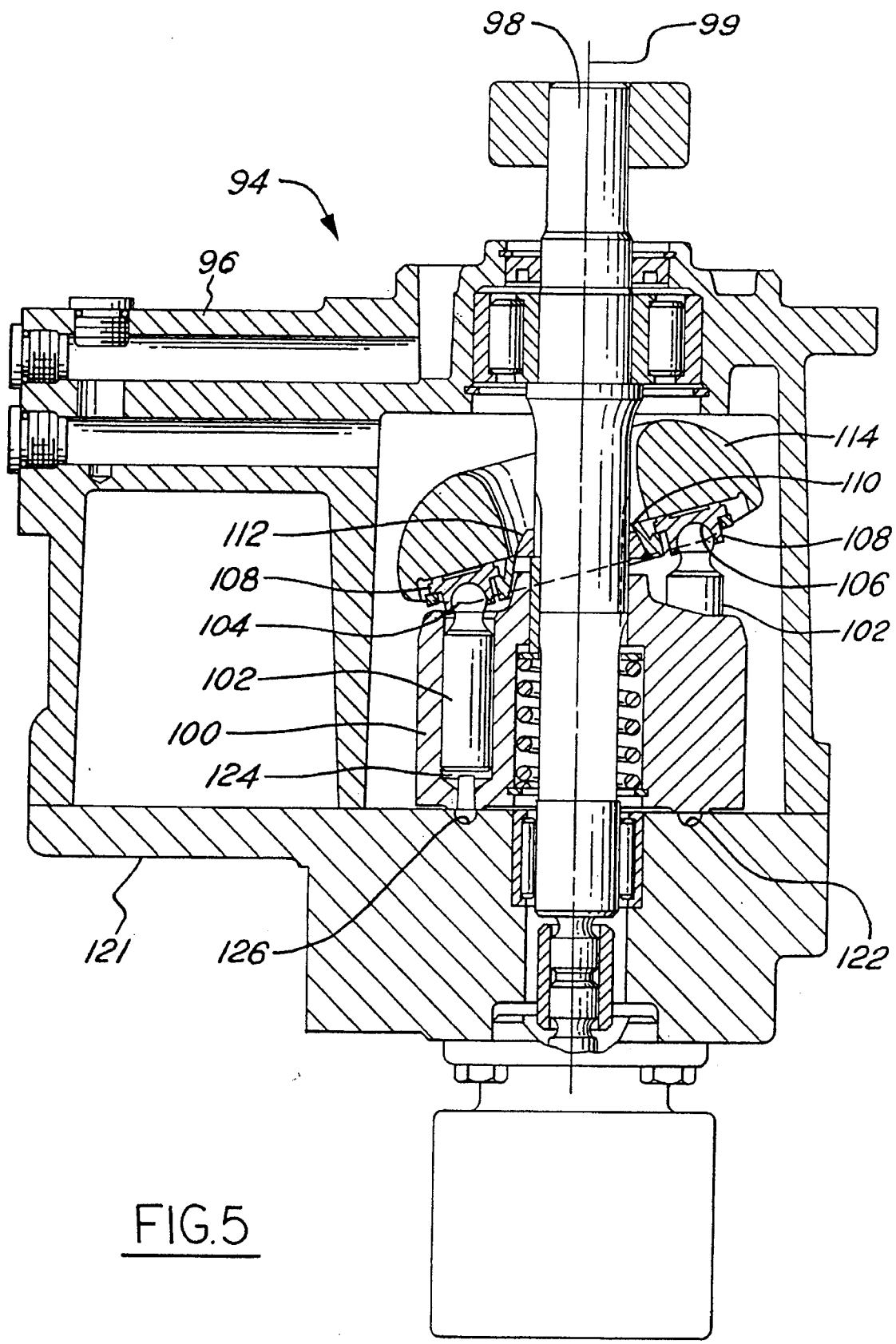
FIG. 5 is a diagrammatic cross-sectional view of one embodiment of a variable displacement pump.
Figure 6:
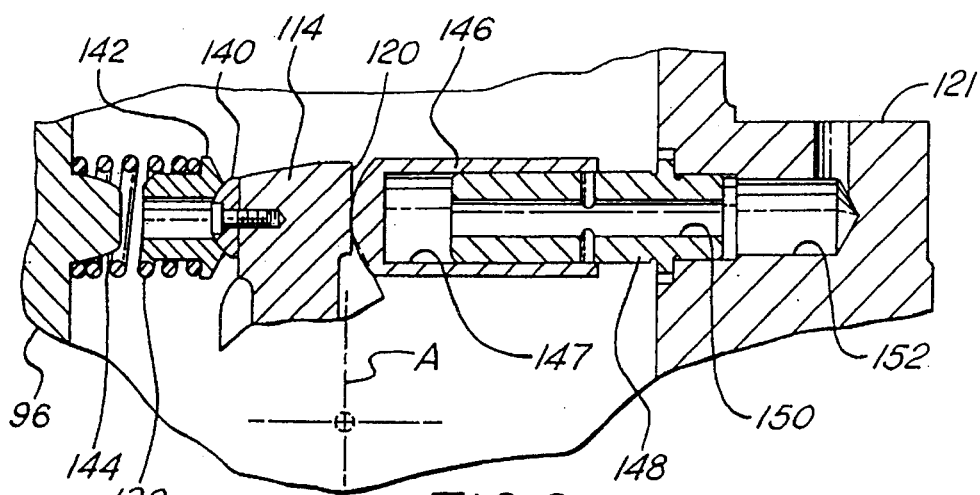
FIG. 6 is a diagrammatic cross-sectional view of a yoke in a first position corresponding to a minimum pump displacement.
Figure 7:
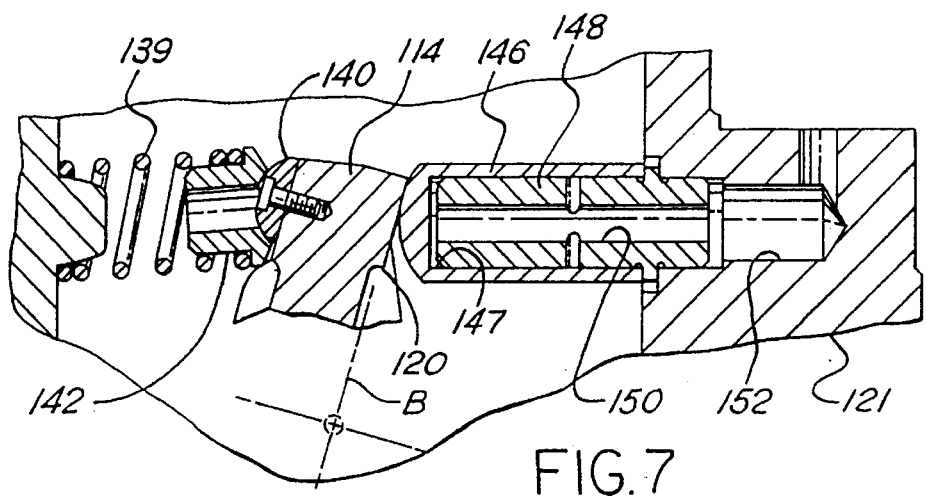
FIG. 7 is a diagrammatic cross-sectional view of the yoke in a second position corresponding to a maximum pump displacement.

The variable-displacement hydraulic pump 94, shown in greater detail in FIG. 5, preferably has a housing 96 with a pump shaft 98 rotatably disposed therein for rotation about a pump axis 99. A cylinder block 100 is engaged with the pump shaft 98 for rotation therewith by axial splines. The cylinder block has one or more pistons 102, for example nine, disposed therein for axial movement parallel to the pump shaft axis 99. A first end 104 of each piston is preferably spherically shaped and is disposed in a complementary socket 106 of a shoe 108. A single shoe 108 for each piston 102 is disposed in a shoe retainer 110. The shoe retainer 110 has a concave spherical surface slidably engaging a convex spherical surface of a spherical washer 112 disposed on the pump shaft 98. A side of the shoes 108 opposite the socket 106 is slidably disposed against a race surface of a yoke 114. The yoke 114 is pivotally disposed in the pump housing 96 and is movable through a range of angular positions controlling the stroke length of the pistons and thereby controlling the fluid output of the pump.

Figure 11:
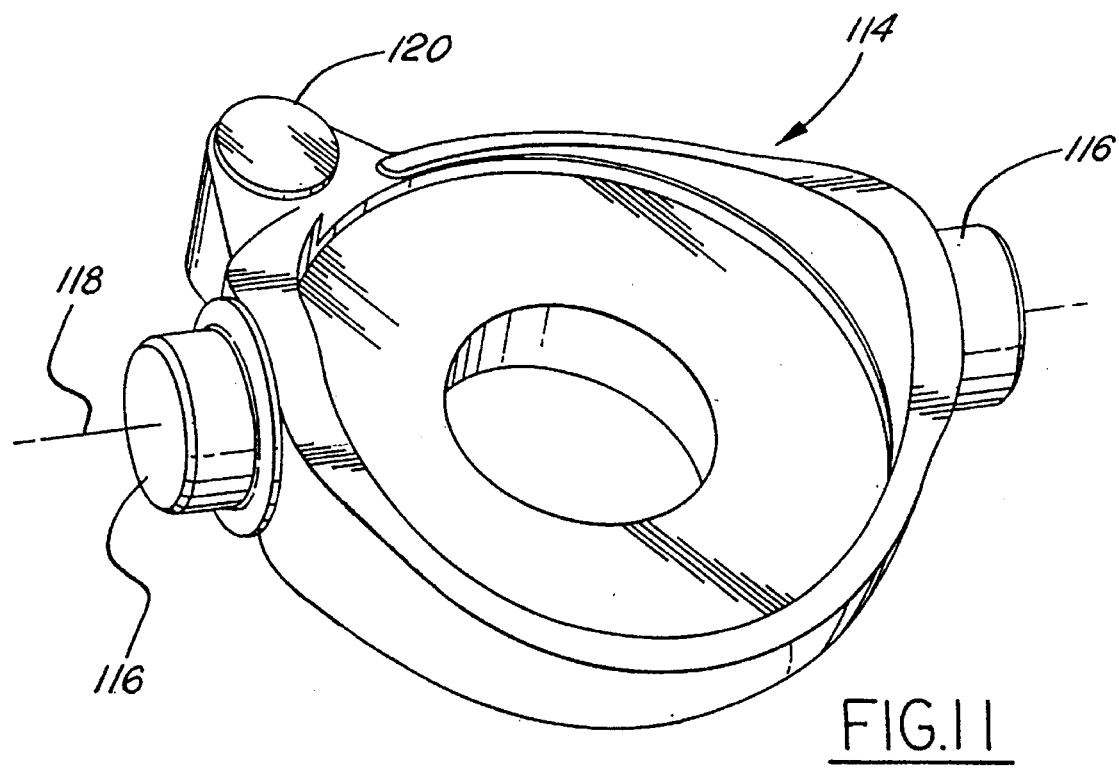
FIG. 11 is a perspective view of a yoke.

The yoke 114, shown in greater detail in FIG. 11, has a pair of cylindrical posts 116 for pivoting about yoke axis 118 in the pump housing 96. The yoke 114 pivots about the yoke axis 118 but does not rotate about pump shaft axis 99. The yoke 114 also has an engagement surface 120. The position of the yoke 114 is selectively adjustable to a range of angular positions between and inclusive of a first position A, shown in FIG. 6, corresponding to a minimum pump displacement and second position B, shown in FIG. 7, corresponding to a maximum pump displacement.

Figure 8:
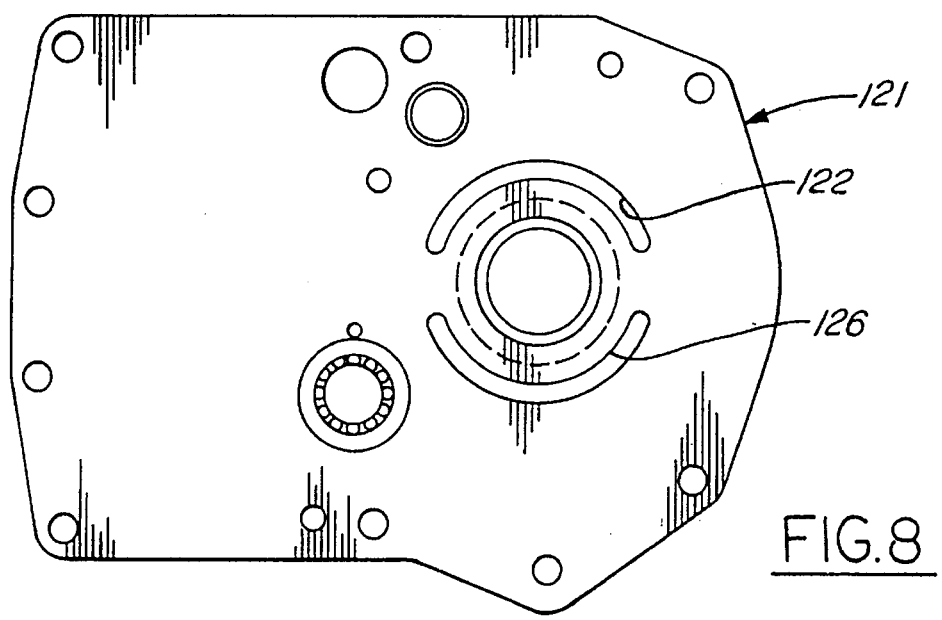
FIG. 8 is an elevational view of a pump housing end cover.

An end cover portion 121 of the housing shown in FIG. 8, has an intake port 122 through which actuating fluid enters piston cavities 124 and an output port 126 through which fluid exits the piston cavities 124. As shown in FIG. 1, hydraulic actuating fluid reaches the intake port 122 indirectly from the sump 74 from which the fluid is drawn by a low pressure transfer pump 130 and passed through a cooler 132 and a filter 134 before reaching the variable-displacement pump 94.

A pressure transducer 136, able both to detect the pressure of the hydraulic actuating fluid and to generate a pressure signal indicative of the pressure detected, is in fluid communication with the output port 126. Preferably, the transducer 136 is mounted in one of the actuating fluid manifolds 42. Alternatively, the transducer 136 can be mounted in the housing 96 or anywhere in the downstream pressure actuating fluid circuit.

The pressure of the hydraulic actuating fluid will typically be consistent between the output port 126 and the hydraulic actuating fluid manifolds 42 with pressure at the output port 126 being slightly higher. Preferably, check valves 138 are disposed between the output port 126 of the pump 94 and the manifolds 42.

The electronic control module 26 is electronically connected with the pressure transducer 136 for receiving the pressure signal S6 therefrom, and electronically compares the pressure signal S6 with a predetermined reference value. The electronic control module 26 emits the output signal S9 with an electrical current which is adjusted to minimize the magnitude of a variance between the pressure signal S6 and the predetermined reference value.

The predetermined reference value is operably determined by the electronic control module 26 as a function of one or more input data signals indicative of parameters such as engine speed S1, engine crankshaft position S2, engine coolant temperature S3, engine exhaust back pressure S4, air intake manifold pressure S5, and throttle position or desired fuel setting S7. The input data signals may also include the transmission operating condition indicative signal S8, or other appropriate parameters not specifically mentioned here.

Figure 9:
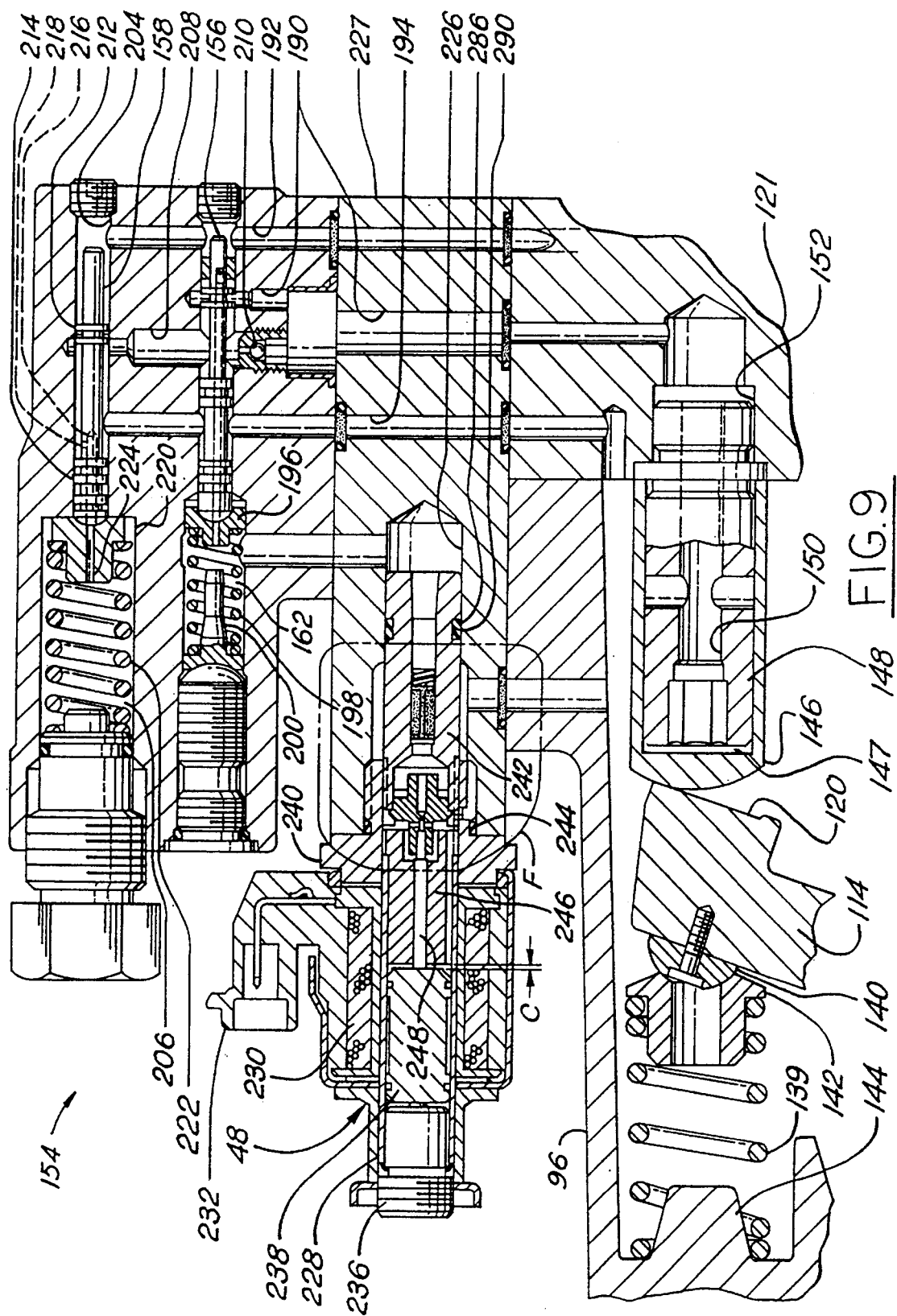
FIG. 9 is a diagrammatic cross-sectional view of a pump control valve body.

Referring to FIG. 9, the engagement surface 120 of the yoke 114 is disposed between a yoke return spring 139 and a control or apply piston 146 which cooperate to pivotally position the yoke 114. The engagement surface 120 of the yoke is relatively flat. A side of the yoke 114 opposite the engagement surface 120 has mounted therein a semi-spherical stud 140. This semi-spherical stud 140 is slidably engaged by a spring retainer 142. The spring retainer 142 has a concave semi-spherical surface complementary to the spherical stud 140 and has a shank portion loosely disposed in the yoke return spring 139. The yoke return spring 139 is held between the spring retainer 142 and a boss 144 in the housing 96.

The control piston 146 has a convex spherical end surface in tangential contact with the engagement surface 120 of the yoke 114. The control piston 146 defines a cavity 147 allowing the piston to be slidably disposed over a control rod 148. The control rod 148 has a center aperture 150 passing therethrough. The control rod 148 is fixed in a control rod aperture 152 in the end cover portion 121.

The control rod aperture 152 fluidly communicates with a valve body 154 of the variable-displacement pump 94 as shown in FIG. 9. The valve body includes a load sensing spool valve 156 and a pressure limit spool valve 158. The valve body 154 is in turn connected to the pump control valve 48. Together, the control piston 146 and the valve body 154 essentially serve as positioning means for the yoke 114. It should be noted that the valve body 154 and associated control elements are disposed within the pump housing 96 even though they are shown as being separate from the variable displacement pump 94 in the figures. An aggregation of these elements is a pump unit 159.

Figure 12:
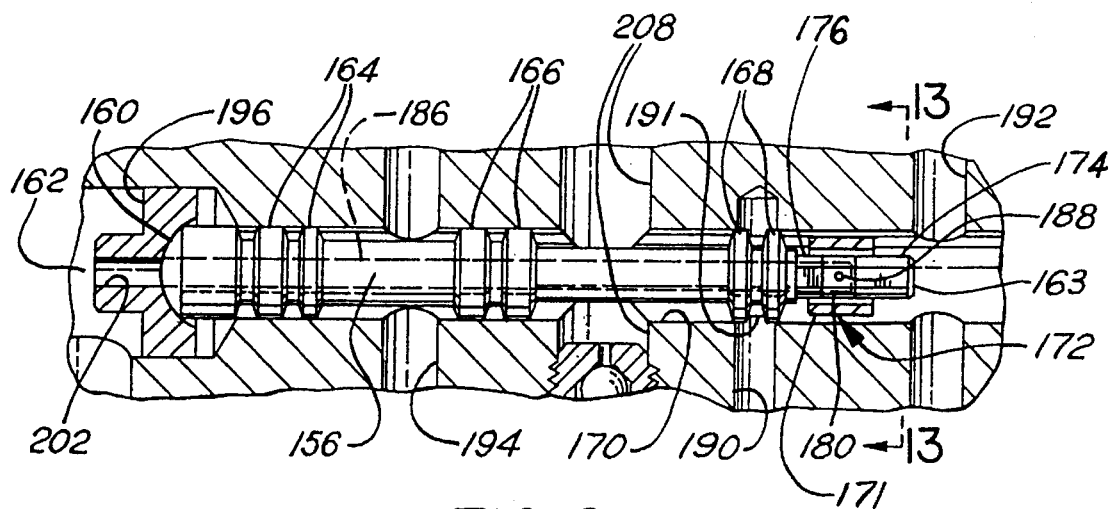
FIG. 12 is a side view of a load sensing spool valve.

The load sensing spool valve 156, best seen in FIG. 12, has a first end portion 160 in fluid communication with a fluid reference chamber 162 and a second end portion 163 in fluid communication with the output port 126 via an output passage 192. The load sensing spool valve 156 has a plurality of lands distributed at three locations along its length. First guiding lands 164 for the load sensing spool valve 156 are proximate to the first end portion 160 of the spool valve. Second metering lands 166 of the load sensing spool valve 156 are disposed approximately midway along the length of the valve 156. Third metering lands 168 are proximate to but not at the second end portion 163 of the load sensing spool valve 156. The valve 156 is slidably disposed in a load sensing spool valve bore 170 of the valve body 154.

Figure 13:
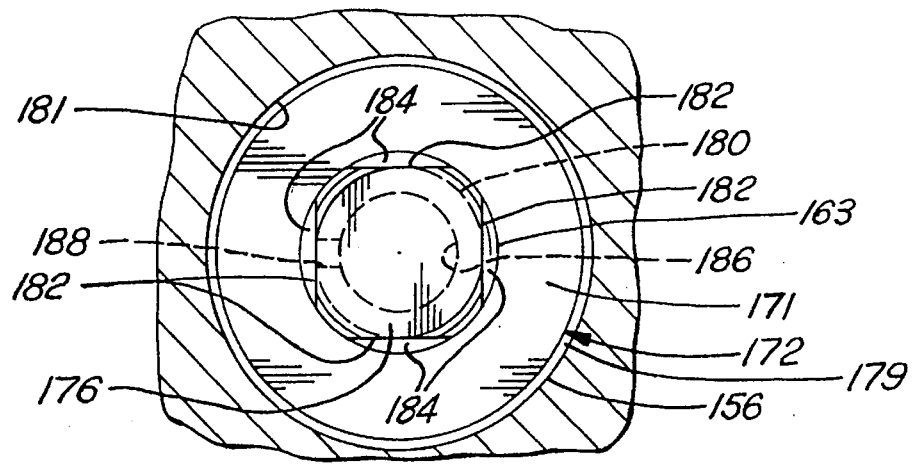
FIG. 13 is an end view of the load sensing spool valve.

A portion of the load sensing spool valve 156 extending from the third metering lands 168, together with a sleeve 171 placed thereover defines an edge filter 172. The edge filter 172 has first and second generally square cross-sectional internal portions 174 and 176 respectively formed on the valve 156 as best seen in FIG. 13. Each of the square cross-sectional portions has its corners radiused to provide an engaging surface for the sleeve 171 to be pressed onto the load sensing spool valve 156 over the square internal portions 174 and 176. The sleeve 171 of the edge filter 172 is sized to provide a generous annular flow area 179 between itself and a wall 181 of the bore 170.

The square cross-sectional portions 174 and 176 are separated by a radial groove 180 disposed therebetween. Flats 182 of the square portions, together with the filter sleeve 171, define inlet passages 184 therebetween. The load sensing spool valve 156 has a longitudinal passage 186 extending from the first end portion 160 of the valve to near the second end portion 163 of the valve. At the second end portion of the valve, beyond the third metering lands 168, an orifice 188 passes from the radial groove 180 into the longitudinal passage 186. The inlet passages 184 have a maximum height less than a diameter of the orifice 188 in the valve 156, about 0.5 mm (0.020 inches) in this embodiment. The total area of the inlet passages 184, as viewed from the end of the valve 156, is preferably about ten times the area of the orifice 188. This allows the inlet passages 184 to readily communicate a sufficient flow of hydraulic actuating fluid while preventing the passage of pieces of debris sufficiently large to block the orifice 188 of the load sensing spool valve 156.

A piston control passage 190 through the valve body 154 and the end cover portion 121 fluidly communicates with the load sensing spool valve bore 170. The load sensing spool valve 156 in a neutral position has its third metering lands 168 essentially aligned with a piston control port 191, formed by entry of the piston control passage 190 into the load sensing spool valve bore 170, thereby preventing passage of fluid into or out of the control piston 146. The piston control passage 190 is in fluid communication with the center aperture 150 of the control rod 148. Output passage 192 provides fluid communication between the pump outlet port 126 and the load sensing spool valve bore 170 at a point generally corresponding to the location of the second end of the load sensing spool valve 156. A sump passage 194 fluidly communicates with the load sensing spool valve bore 170 at a location between the first guiding lands 164 and the second metering lands 166 of the load sensing spool valve 156 and provides a pathway from which the fluid can ultimately return to the sump 74.

A load sensing spool valve spring retainer 196 has a concave spherical surface for contact with the first end portion 160 of the load sensing spool valve 156. The load sensing spool valve spring retainer 196 has a shank portion disposed in a first end of a load sensing spool valve spring 198. A second end of the load sensing ,pool valve spring is disposed over an axially extending load sensing spool valve stop 200. The load sensing spool valve spring 198 and the spring retainer 196 are disposed in the fluid reference chamber 162. The load sensing spool valve spring retainer 196 has an orifice 202 extending axially therethrough and aligned with the longitudinal passage 186 of the load sensing spool valve 156. The load sensing spool valve stop 200 serves to limit travel of the load sensing spool valve 156 into the fluid reference chamber 162.

Referring to FIG. 9, the pressure limit spool valve 158 is disposed in a pressure limit spool valve bore 204. The output passage 192 fluidly communicates with the pressure limit spool valve bore 204 at a first end of the pressure limit spool valve bore 204. A second end of the pressure limit spool valve bore 204 opens to a spring chamber 206. A relief passage 208 fluidly communicates with the pressure limit spool valve bore 204 at a location between the output passage 192 and the spring chamber 206. The relief passage 208 also fluidly communicates with the load sensing spool valve bore 170 at a location between the second metering lands 166 and the third metering lands 168 of the load sensing spool valve 156. The relief passage 208 also fluidly communicates with the piston control passage 190. A piston control check valve 210 is disposed in the relief passage 208 between the load sensing spool valve bore 170 and the piston control passage 190 such that fluid may enter the piston control passage 190 through the check valve 210 but may not exit therethrough.

The sump passage 194 fluidly communicates with the pressure limit spool valve bore 204 at a location between the spring chamber 206 and the relief passage 208. The pressure limit spool valve 158 has first metering lands 212 disposed for approximate alignment with the relief passage 208. Second guiding lands 214 are disposed at the second end portion of the pressure limit spool valve 158, and are located between the sump passage 194 and the spring chamber 206. The pressure limit spool valve 158 has a longitudinal passage 216 axially passing through the second end portion and to a location between the first and second lands 212, 214. An orifice 218 passes through the pressure limit spool valve 158 normal to and intersecting the longitudinal passage 216.

A spring retainer 220 for the pressure limit spool valve 158 has a concave spherical surface against which is disposed the second end portion of the pressure limit spool valve 158. The spring retainer 220 has a shank portion disposed in a pressure limit control spring 222 in the spring chamber 206. An axial orifice 224 passes through the spring retainer 220 and is aligned with the longitudinal passage 216 of the pressure limit spool valve 158. A second end of the pressure limit control spring 222 is disposed against a second end of the spring chamber 206.

Figure 10:
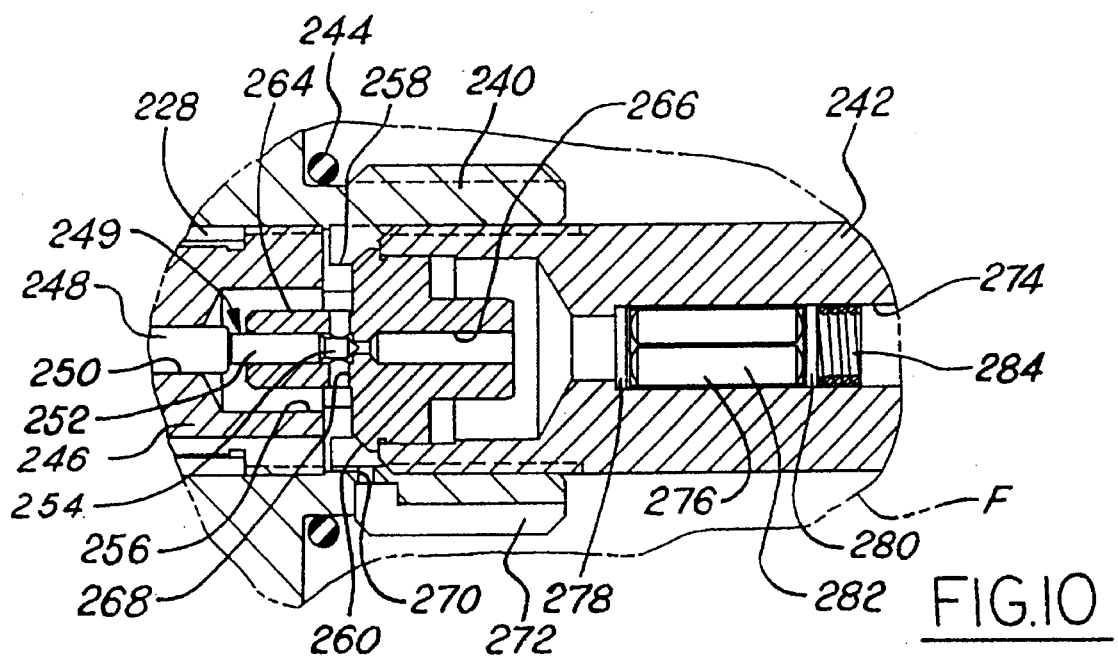
FIG. 10 is an enlarged diagrammatic cross-sectional view of circle F of FIG. 9.

The pump control valve subassembly 48, best seen in FIGS. 9 and 10, is in part disposed in a control valve bore 226 in a valve body extension 227. The pump control valve 48 has a cylindrical sleeve portion 228 extending outward from the valve body extension 227. A solenoid coil 230 surrounds part of the sleeve 228 extending from the valve body extension 227. An electrical connector 232 extends from the solenoid coil 230 so that an electrical conductor can transmit signal S9 from the ECM 26 to the solenoid coil 230. In a first end of the cylindrical sleeve portion of 228 of the control valve 48 distal to the valve body extension 227, a control valve plug 236 is disposed to seal that end of the cylindrical sleeve portion 228. Slidably disposed within the cylindrical sleeve portion 228 and generally aligned with the solenoid coil 230 is a solenoid armature 238.

A collar portion 240 is disposed over a second end of the cylindrical portion 228, and links the sleeve portion 228 with axially aligned cage portion 242. The collar portion 240 has internal threads threadingly engaging the cage portion 242. The collar portion 240 also has external threads retaining it in the valve body extension 227 and a seal 244 resisting the flow of any actuating fluid between the collar portion 240 and the valve body extension 227.

A solenoid stator 246 is largely disposed in the cylindrical sleeve portion 228. The stator 246 is restrained from axial movement. The length of the stator is such that there is a selected axial gap C between the armature 238 and the stator 246 when the armature is disposed against the control valve plug 236. An actuating pin 248 is slidably disposed in a pin bore 250 passing axially therethrough. The actuating pin 248 pushes against a poppet pin 249 having a relatively larger diameter guide portion 252 and a poppet head portion 254.

The stator 246 has a lubrication aperture 256 which is larger in diameter than the pin bore 250 and which is disposed opposite the armature 238. A stator boss 258 extends from the stator around the lubrication aperture 256.

A seat 260 for the poppet head 254 is largely disposed in a seat bore in the cage 242 and abutting the stator boss 258. The poppet head seat 260 has a shank portion 264 axially extending into the lubrication aperture 256.

The seat 260 has an axially extending aperture 266 passing therethrough. The aperture through the seat varies in diameter along its axis. A first diameter of the aperture 266 is sufficiently large to accommodate sliding motion of the pin transition portion 252 therein. The aperture 266 has a second diameter portion smaller than the poppet head 254. This second small diameter portion expands to a third larger diameter portion open to a void in the cage 242.

The poppet head 254 operably and sealingly seats against the poppet head seat 260 to block flow from the cage 242 past the poppet head 254. The poppet head seat 260 has an exhaust passage 268 intersecting the aperture 266 of the poppet head seat to connect it with the lubrication aperture 256 at a location approximately aligned with the pin transition portion 252. The exhaust passage 268 is also in fluid communication with an exhaust channel 270 in the collar portion 240 for passage of fluid to an exhaust chamber 272 of the valve body for passage to the sump 74.

The cage 242 has an axial aperture 274, part of an inlet passage of the valve 48, extending therethrough. A first end of the cage axial aperture 274 for fluid communication with the aperture 266 through the poppet head seat 260. An edge filter 276, similar in function to the edge filter 172 of the load sensing spool valve 156, is disposed in the cage axial aperture 274. The edge filter 276 disposed within the cage 242, however, differs in that it is not integrated into a valve spool. The present edge filter 276 similarly has first and second square cross-sectional portions 278 and 280 with an axially extending connecting member 282. A retaining spring 284 is disposed on one side of the edge filter, retaining the edge filter between the spring and the cage 242. A seal 286 is disposed in a groove 290 proximate to an end of the cage 242 to provide a radial sealing relationship between the cage 242 and the control valve bore 226.

INDUSTRIAL APPLICABILITY

The closed-loop pressure control system 10 of FIG. 3 operates in the following manner. Hydraulic actuating fluid is communicated from the output port 126 to both the output passage 192 and to the hydraulic actuating fluid manifolds 42. The pressure transducer 136 detects pressure of the actuating fluid and generates a pressure signal S6 indicative of the pressure detected. The pressure signal S6 is conducted by an electrical conductor to the electronic control module 26. Input signals S1 through S5 and S7 and S8 are used by the electronic control module 26 to determine a pressure reference value, or an appropriate pressure for the hydraulic actuating fluid within the hydraulic actuating fluid manifolds 42. The electronic control module 26 compares the pressure reference value with the pressure indicative signal S6 generated by the transducer 136. The electronic control module 26 then decreases the amount of electrical current of output signal S9 to the solenoid if the pressure in the manifolds 42 is too high, increases output signal S9's current if the pressure is too low, or maintains the level of current if there is no appreciable difference between the signal S6 and the pressure reference value.

A decrease in current of signal S9 has the effect of reducing pressure within the fluid reference chamber 162 (FIG. 9) by means of a mechanism explained in more detail below. An increase in current of signal S9 has the effect of increasing the pressure within the fluid reference chamber 162. Fluid in the fluid reference chamber 162 is provided by fluid passing from the output passage 192 through the orifice 188, longitudinal passage 186 of the load sensing spool valve 156, and orifice 202 of the spring retainer 196.

Changes in pressure within the fluid reference chamber 162 essentially control a magnitude of a pressure drop across the load sensing spool valve 156. The fluid drops in pressure as it passes through the orifice 188, longitudinal passage 186, and orifice 202. Preferably, the orifice 188 is sized to be the dominant restriction in order to provide the majority of such pressure drop. The orifice 188 should be large enough to provide adequate response and avoid plugging and small enough to minimize hydraulic control signal flow requirements. A larger difference in pressure between the fluid reference chamber 162 and the output passage 192 produces a greater resultant pressure drop. This pressure drop across the load sensing spool valve 156 multiplied by the working area of the valve equals a resultant fluid pressure force opposing or supplementing the force of the load sensing spool valve spring 198. The spring force and the pressure drop across the spool valve 156 resultantly controls the position of the valve 156 within the bore 170. In this embodiment, the pressure drop needed to overcome the spring force on the valve 156 is about 4 to 5 MPa (580 to 725 psi). It is the position of the valve 156 within the bore 170 which controls the positioning of the yoke 114. The valve 156 has three operating positions corresponding to increasing, decreasings or maintaining the operating displacement of the variable-displacement pump 94.

When the resultant fluid pressure force is less than the spring force, the load sensing spool valve 156 moves toward the output passage 192, opening the piston control passage port 191. The yoke return spring 139, pressing the yoke's engagement surface 120 against the control piston 146, causes the piston 146 to move axially along the control rod 148 when the load sensing spool valve 156 is so positioned. Fluid from the control piston cavity 147 then moves through the piston control passage 190 and past the third motoring lands 168. The fluid then passes into the load sensing spool valve bore 170 between the second metering lands 166 and third motoring lands 168, through relief passage 208 to the pressure limit spool valve bore 204, and through the sump passage 194 ultimately to the hydraulic actuating fluid sump 74. As the fluid exhausts from the control piston cavity 147, the yoke moves toward the second position B, increasing the fluid output of the pump 94.

When a pressure drop of fluid passing through the orifice 188 and the longitudinal passage 186 of the load sensing spool valve 156 is approximately equal to the load of the spring 198, then the valve 156 is held in a position over the piston control passage port 191 preventing appreciable entry or exit of fluid therethrough to maintain a constant pump displacement.

When the resultant fluid pressure force acting on the valve 156 is greater than the force of the spring 198, the load sensing spool valve spring 98 is overcome and the valve 156 is displaced toward the reference chamber 162, opening the piston control passage port 191. This allows entry of pressurized fluid from the output passage 192 into the piston control passage 190. Pressurized hydraulic actuating fluid from the output passage 192 displaces the piston 146 along the control rod 148, overcoming the yoke return spring 139 and forcing the yoke 114 toward the first position A, and decreasing the output of the pump 94. The piston control check valve 210 prevents the escape of hydraulic actuating fluid into the relief passage 208. The load sensing spool valve stop 200 serves to limit travel of the load sensing spool valve 156 and its associated spring retainer 196 into the fluid reference chamber 162.

When electrical current of the signal S9 is increased by the electronic control module 26, the solenoid armature 238 of the pump control valve 48 is pressed toward the solenoid stator 246. The solenoid armature 238 contacts the pin 248 before it contacts the solenoid stator 246. The force of the armature 238 against the pin 248, 249 restricts and potentially blocks the flow of hydraulic actuating fluid through the aperture 266 and past the poppet head 254 of the pin 249 by firmly seating the poppet head 254 into the poppet head seat 260.

Hydraulic actuating fluid from the output passage 192 flows into the edge filter 172 and through the orifice 188. The fluid enters the edge filter 172 from two sides. Fluid enters on a first side through the flow area 184 between the sleeve 171 and a first square cross-sectional, or internal portion 174 of the filter. Fluid also passes through the annular flow area 179, around the sleeve 171, to enter a side of the edge filter through the flow area 184 between the sleeve 171 and the second square cross-sectional, or internal portion 176 of the filter 172. The fluid then flows through the longitudinal passage 186 of the load sensing spool valve 156 and into the fluid reference chamber 162, from which fluid exit is now more restricted, thereby increasing the fluid pressure therein. This continues until the net fluid pressure force on the load sensing spool valve 156 is less than the spool valve spring force, at which point the load sensing spool valve spring 198 displaces the load sensing spool valve 156 toward the output passage 192. With the valve 156 biased toward the output passage 192, fluid is exhausted from the control piston cavity 147 to increase the output of the pump 94 as described above.

The pump control valve 48 thus establishes the pressure within the fluid reference chamber 162 by restricting the exit of fluid therefrom. Fluid escapes between the poppet head seat 260 and the poppet head 254 with the force therebetween induced by the current flowing through the armature 238 and stator 246 thereby establishing the pressure in the reference chamber 162. Fluid escaping between the poppet head 254 and the poppet head seat 260 flows through the exhaust passage 268 to the exhaust channel 270 and then through the exhaust chamber 272 and finally returning to the sump 74.

When the electronic control module 26 determines that the pressure of the hydraulic actuating fluid in the manifold(s) 42 is too high, it reduces the electrical current of signal S9 to the pump control valve 48. The reduced current reduces the force between the solenoid armature 238 and the solenoid stator 246, allowing more fluid to escape past the poppet head 254 and the poppet head seat 260, consequently reducing the pressure in the reference chamber 162. This drop in pressure causes the load sensing spool valve 156 to be displaced toward the reference chamber 162 and a resultant decrease in output of the pump 94.

Pressurized fluid from the output passage 192 first passes through the edge filter 172 as previously described before entering the orifice 155 in the load sensing spool valve 156. The edge filter 172 provides minimal restriction to flow while preventing the passage of large pieces of debris which could block the orifice 155 in the load sensing valve 156. Blockage of the orifice would prevent fluid from reaching the fluid reference chamber 162, with the load sensing valve 156 being displaced toward the fluid reference chamber, and the yoke being moved toward first position A with the consequent drop in pressure in the manifold(s) 42. A drop in actuating fluid pressure in the manifold(s) results in a lower fuel injection pressure provided by fuel injectors 20.

Pressure limit spool valve 158 has a neutral position in which its first metering lands 212 are disposed toward the output passage 192, leaving the relief passage 208 in near constant fluid communication with the sump passage 194. The valve 158 is maintained in this position against opposing output pressure by the pressure limit control spring 222.

Only when the output pressure of the hydraulic actuating fluid in the output passage 192 exceeds a predetermined level established by the pressure limit control spring 222 does fluid from the output passage 192 flow along the pressure limit spool valve bore 204. Sufficiently high output pressure in the pressure limit spool valve bore 204 displaces the pressure limit spool valve 158 toward the spring chamber 206 with the first lands 212 now allowing flow into the relief passage 208, but preventing flow of the fluid further down the pressure limit spool valve bore. Fluid passes through the relief passage 208 and then through the piston control check valve 210. The hydraulic actuating fluid then continues on into the piston control passage 190 through the center aperture of the control rod 150, axially displacing the piston 146 to move the yoke 114 toward the first position A.

This function is served by the pressure limiter valve 158 on only rare occasions where the load sensing spool valve 156 and pump control valve 48 did not serve to regulate pressure as required.

The edge filter 276 of the pump control valve 48 prevents the passage of relatively large pieces of debris from the direction of the reference chamber 162 from blocking or in any way interfering with the relatively small aperture 266 in the poppet head seat 260 much as does the edge filter 172 of the load sensing spool valve 156 protects the orifice 188 from plugging.

The variable-displacement pump 94 is able to better match the displacement of the pump to the system flow requirements which vary over engine operating conditions. Consequently, engine pump flow losses are reduced and the engine's operating efficiency is thereby improved. A single variable-displacement pump configuration can meet the requirements of a wide range of engine applications while minimizing parasitic losses present with a fixed-displacement pump configuration covering the same range of applications. Moreover, a properly sized variable-displacement pump configuration can compensate for system deterioration due to normal wear and resultant leakage occurring over time.

Other aspects, objects, and advantages of this invention can be obtained from a study of the drawings, the disclosure, and the appended claims.

I claim:

1. An edge filter in combination with a valve slidably disposed within a bore, said combination comprising:

a valve body having a valve bore;

a valve slidably disposed within the valve bore;

an internal portion of the edge filter axially extending from the valve and having an axially extending cavity and having an orifice with an orifice flow area intersecting the cavity;

a sleeve for defining an external surface portion of the edge filter, said sleeve having a first end and a second end and having an outside diameter smaller than the valve bore and being disposed over the orifice with both ends of the sleeve being axially spaced from the orifice and with inner surfaces portions of the sleeve radially engaging outer surface portions of the internal portion and defining a first radial gap between the sleeve and the internal portion at the first end of the sleeve and defining a second radial gap between the sleeve and the internal portion at the second end of the sleeve, the gaps each having a maximum gap width less than a diameter of the orifice and the gaps having a flow area larger than the orifice flow area wherein fluid in the bore flows into the orifice past both ends of the sleeve and particles in the bore too large to pass through the orifice are stopped by the gaps without appreciably impeding fluid flow through the orifice.

2. An edge filter integrated into a valve as claimed in claim 1 wherein the sleeve is press fit to the internal portion and engages the internal portion at a plurality of circumferentially distributed locations to define a plurality of gaps on each side of the sleeve.

3. An edge filter integrated into a valve as claimed in claim 2 wherein the internal portion has a plurality of flats which together with an inside diameter of the sleeve further defines the gaps.

* * * * *